United States Patent
Welter et al.

(10) Patent No.: US 9,809,068 B2
(45) Date of Patent: *Nov. 7, 2017

(54) AIR MAINTENANCE TIRE

(71) Applicant: The Goodyear Tire & Rubber Company, Akron, OH (US)

(72) Inventors: Carolin Anna Welter, Schleich (DE); Andreas Frantzen, Trier (DE); Jeannot Frieden, Uebersyren (LU); Anne Therese Peronnet-Paquin, Luxembourg (LU); Stephan Rodewald, Canal Fulton, OH (US); Joseph John Kulig, Tallmadge, OH (US); Mingliang Du, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/550,055

(22) Filed: Nov. 21, 2014

(65) Prior Publication Data
US 2015/0165843 A1 Jun. 18, 2015

Related U.S. Application Data

(60) Provisional application No. 61/915,680, filed on Dec. 13, 2013, provisional application No. 61/915,688, filed on Dec. 13, 2013.

(51) Int. Cl.
*B60C 23/12* (2006.01)
*B60C 1/00* (2006.01)

(52) U.S. Cl.
CPC ............ *B60C 23/12* (2013.01); *B60C 1/0025* (2013.01); *Y10T 152/10495* (2015.01)

(58) Field of Classification Search
CPC ................... B60C 23/12; B60C 1/0025; Y10T 152/10495
USPC ........................................................ 152/450
See application file for complete search history.

(56) References Cited

U.S. PATENT DOCUMENTS

| | | | |
|---|---|---|---|
| 7,207,366 B2 | 4/2007 | Sandstrom et al. | |
| 7,231,951 B2 | 6/2007 | Sandstrom et al. | |
| 7,533,707 B2 | 5/2009 | Sandstrom et al. | |
| 7,534,828 B2 | 5/2009 | D'Sidocky et al. | |
| 7,549,454 B2 | 6/2009 | Azer | |
| 7,566,748 B2 | 7/2009 | Sandstrom | |
| 7,694,708 B2 | 4/2010 | Agostini et al. | |
| 7,714,051 B2 | 5/2010 | Hahn | |
| 7,789,119 B2 | 9/2010 | Agostini et al. | |
| 8,042,586 B2 | 10/2011 | Losey et al. | |
| 8,113,254 B2 | 2/2012 | Benedict | |
| 2002/0173577 A1 | 11/2002 | Deevers | |
| 2009/0044892 A1 | 2/2009 | Lippello, III et al. | |
| 2009/0048400 A1 | 2/2009 | Jung et al. | |
| 2009/0218026 A1* | 9/2009 | Giannini .................. | B60C 1/00 152/547 |
| 2012/0073716 A1 | 3/2012 | Benedict | |
| 2013/0160927 A1 | 6/2013 | Hinque et al. | |
| 2013/0160928 A1 | 6/2013 | Hinque et al. | |
| 2013/0160929 A1 | 6/2013 | Frantzen | |
| 2013/0160931 A1 | 6/2013 | Sportelli et al. | |
| 2015/0165842 A1* | 6/2015 | Welter .................. | B60C 23/12 152/523 |

FOREIGN PATENT DOCUMENTS

EP 2028022 A1 2/2009

\* cited by examiner

*Primary Examiner* — Angela C Scott
(74) *Attorney, Agent, or Firm* — John D. DeLong

(57) ABSTRACT

The present invention is directed to a pneumatic tire comprising a sidewall component, the sidewall component including an air passageway extending at least partially about the circumference of the tire, the air passageway surrounded by and in fluid communication with a surface comprising a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamamoyldithio)alkanes, bismaleimides, and biscitraconimides.

2 Claims, 5 Drawing Sheets

FIG—4

AIR MAINTENANCE TIRE

This invention was made with Government support under contract number DEEE0005447 awarded by DOE. The Government has certain rights in the invention.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is desirable, therefore, to incorporate an air maintenance feature within a tire that will re-inflate the tire in order to compensate for normal air diffusion over time without the need for driver intervention.

U.S. Pat. No. 8,042,586 discloses a self-inflating tire assembly that includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim.

U.S. Patent Publication No. 2013/0160928 discloses a method of forming an air passageway in a an air maintenance tire carcass includes: embedding an elongate strip within a pre-cured flexible tire component of a pre-cured tire carcass, the elongate strip extending in a longitudinal direction between an air inlet cavity and an air outlet cavity in the flexible tire component; curing the pre-cured tire carcass including the flexible tire component; extracting the elongate strip longitudinally end-to-end from occupancy within the flexible tire component; and defining an air passageway in the flexible component by the space previously occupied by the withdrawn elongate strip. A free end portion of the strip is accessible at either the air inlet cavity or the air outlet cavity, and the elongate strip may be extracted from either the air inlet cavity or the air outlet cavity by a tensile withdrawal force applied to the elongate strip free end.

SUMMARY OF THE INVENTION

The present invention is directed to a pneumatic tire comprising a sidewall component, the sidewall component including an air passageway extending at least partially about the circumference of the tire, the air passageway surrounded by and in fluid communication with a surface comprising a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamamoyldithio)alkanes, bismaleimides, and biscitraconimides.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A groove is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

There is disclosed to a pneumatic tire comprising a sidewall component, the sidewall component including an air passageway extending at least partially about the circumference of the tire, the air passageway surrounded by and in fluid communication with a surface comprising a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamamoyldithio)alkanes, bismaleimides, and biscitraconimides.

Figure 1:
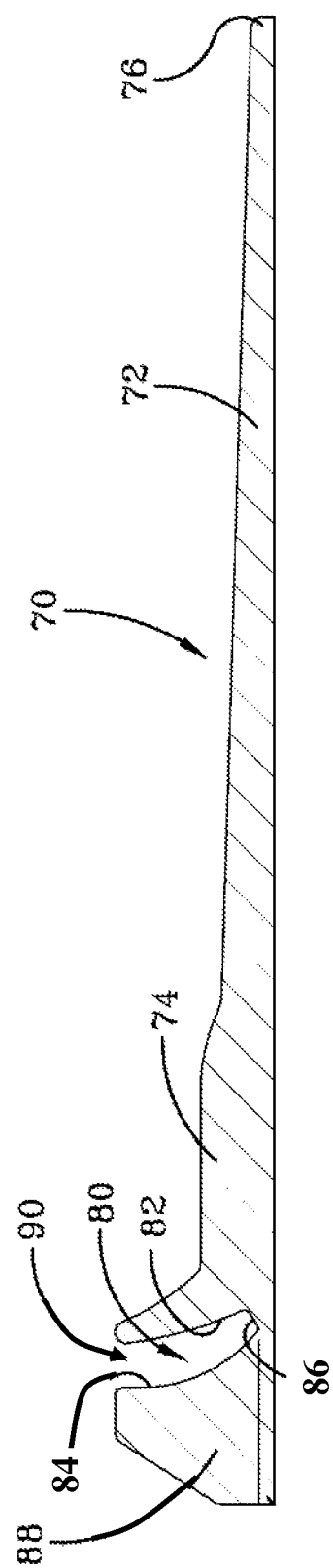
FIG. 1 is a dimensioned sectioned view of an extruded chafer strip.
Figure 2A:
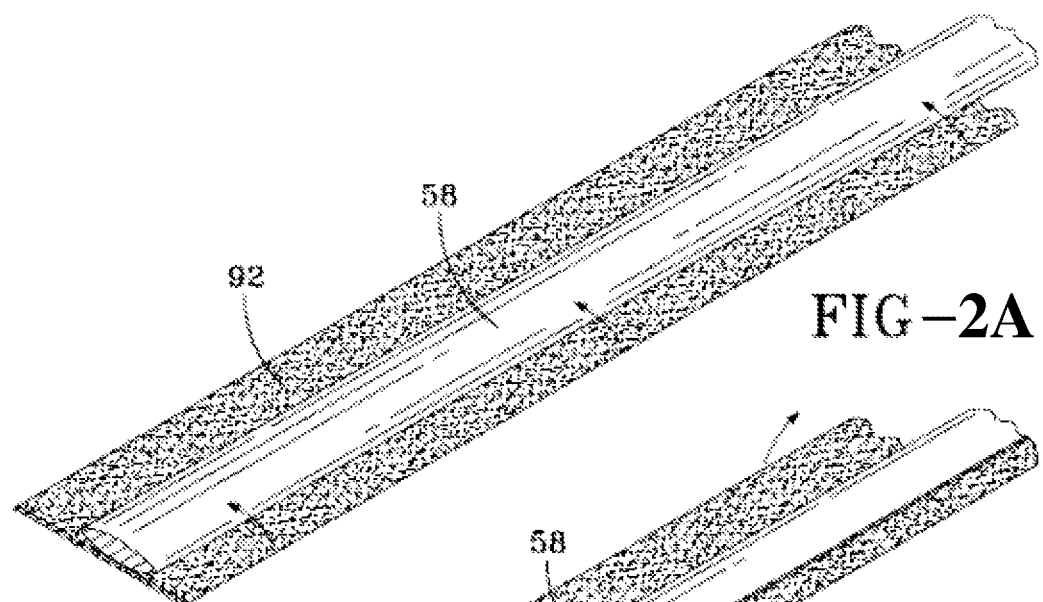
FIGS. 2A through 2C are detailed views showing a strip being covered with a rubber composition.
Figure 2B:
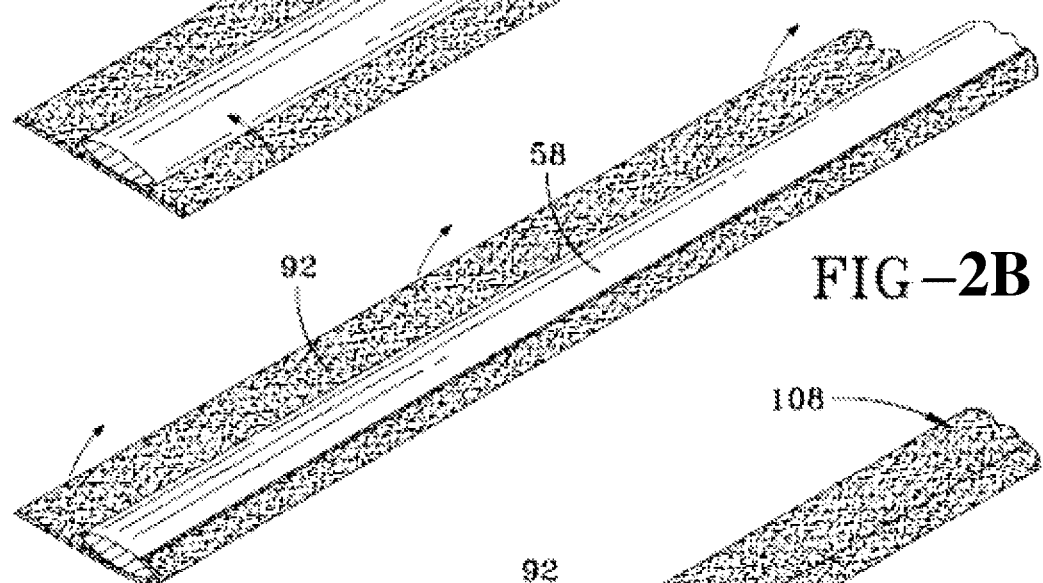
Figure 2C:
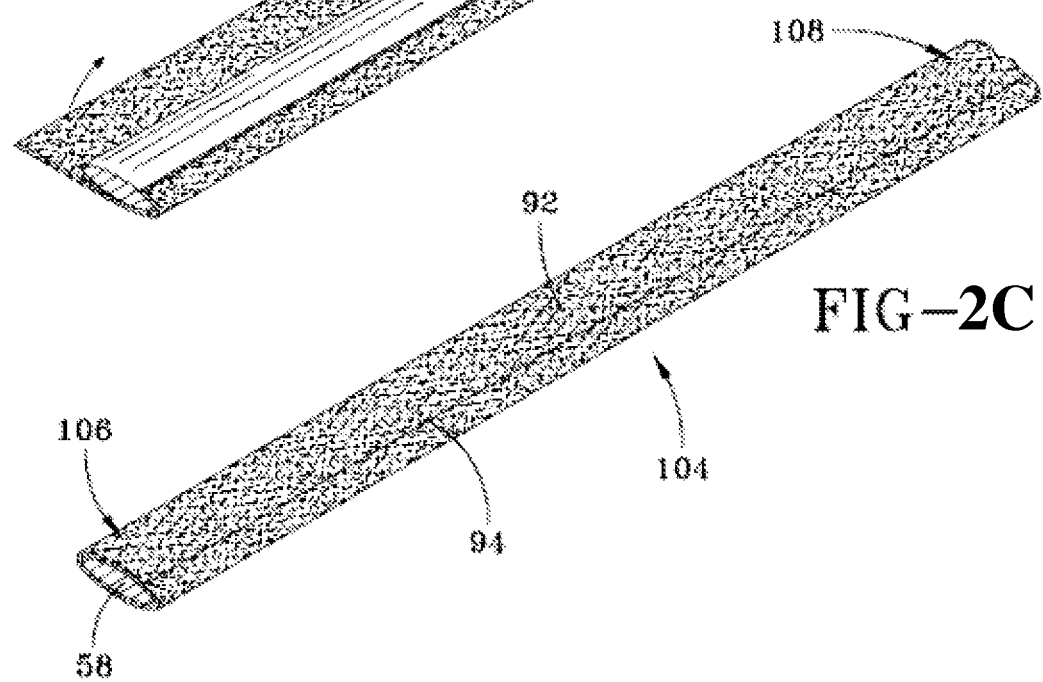

A flexible tire sidewall component, such as a chafer segment 70, is provided with a groove 80, as best seen in section from FIG. 1, is defined by groove lips 82, 84 that angle inwardly from top to bottom to a bottom groove wall 86. Chafer segment 70 further includes an axially outward thick side 88, a thinner side 74 and tapered section 72 terminating in end 76. The groove 80, formed within axially outward thicker side 88 of the chafer strip is accordingly open at groove opening 90. As shown in FIGS. 2A through 2C, a strip 58 can be enveloped within an outer sheath or covering 92 formed of rubber composition. The rubber composition 92 is folded or otherwise applied over the strip 58 to form an overlap seam 94 to enclose the silicone strip 58 and thus forms therewith a sheathed silicone strip assembly 104. The strip assembly 104, as explained following, will be used to form a peristaltic tube within a green tire during green tire construction. The general purpose of strip assembly 104 is to form within a green tire component, such as chafer 70, a core air passageway which, once the strip is removed, forms a peristaltic tube integrally within and enclosed by the tire component.

Figure 3:
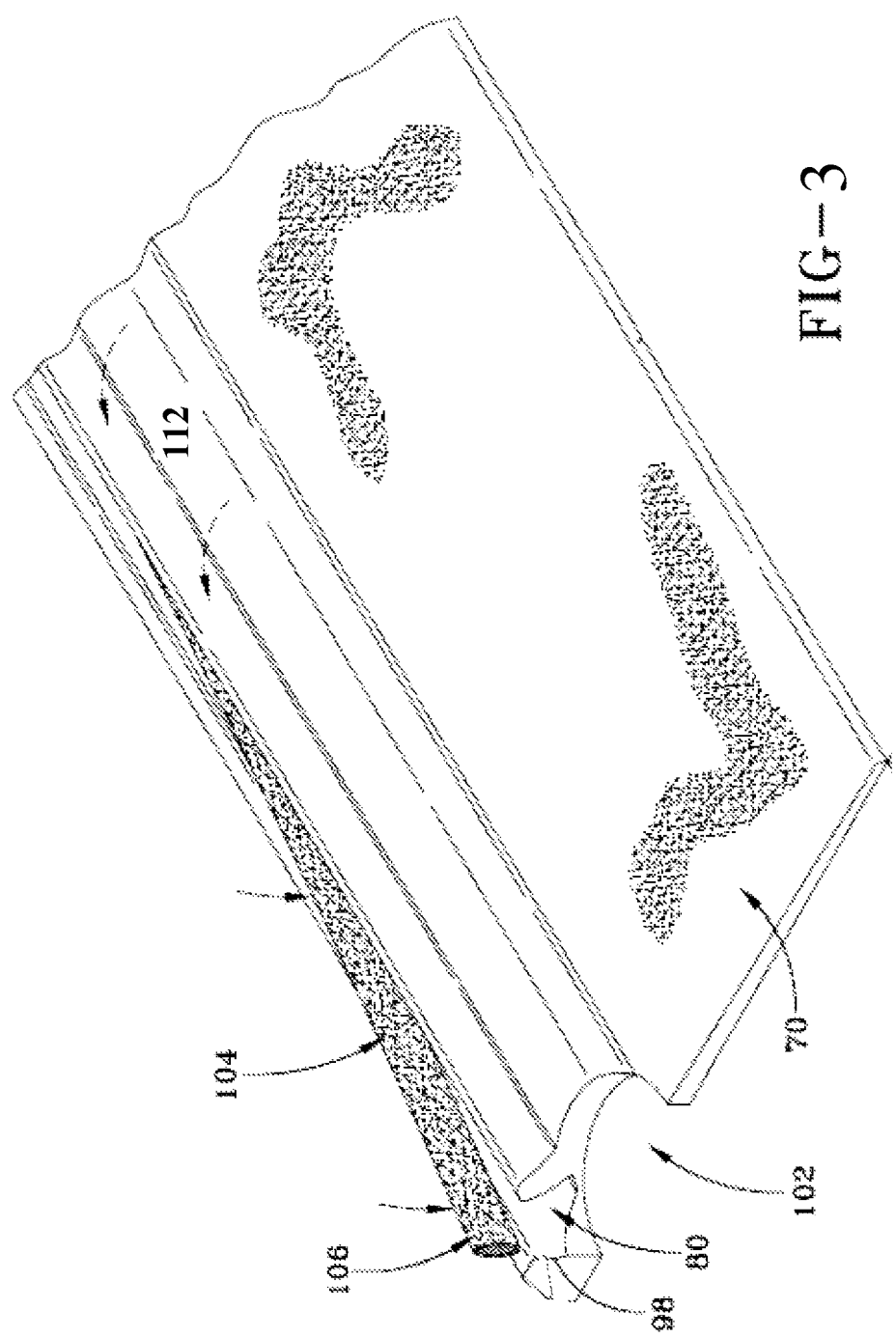
FIG. 3 is an enlarged perspective view of covered strip being assembled into a chafer strip.

With reference to FIGS. 1 and 3, the angled groove 80 is formed within the chafer strip as a slot, with the lips 82, 84 in a close opposed relationship. The groove 80 is then opened to receive the strip assembly 104 by an elastic spreading apart of groove lips 82, 84. Thereafter, the assembly 104 is positioned downward into the groove 80 until reaching a position adjacent to the bottom wall 86. A release of the lips 82, 84 causes the lips to elastic resume their close opposed original orientation. The lips 82, 84 are then stitched together in a rolling operation wherein a roller (not shown) presses the lips 82, 84 into a closed orientation. The angle of the channel 80 with respect to a bottom surface of the chafer strip enables a complete capture of the silicone strip assembly 104 within the tire component, chafer 70, entirely surrounded by the chafer strip material composition.

With reference to FIGS. 3 and 2A through 2C, the channel 80 is destined to become the tube component to a peristaltic pump assembly within the tire chafer 70 and generally extends from chafer strip ends 98. The chafer is cut at a given length depending on the pump length that is desired when the tire is cured. Formed within each end of the chafer by a punching operation or cutting operation are enlarged diameter circular holes 102. The holes 102 are adjacent the ends of the channel 80 and are sized to accommodate receipt of peristaltic pump inlet and outlet devices (not shown). The lips 82, 84 of the chafer channel 80 are pulled apart. The wrapped strip assembly 104 is inserted into the channel 80 as shown in FIG. 3 until adjacent and contacting the lower wall 86 of the channel 80. Thereupon, the strip assembly 104 is enclosed by the chafer by a folding over of the chafer lip flap 82 in direction 112. The channel 80 is thus closed and subsequently stitched in the closed position by a pair of pressure contact rolls (not shown). So enclosed, the assembly 104 will preserve the geometry of the channel 80 from green tire build until after tire cure when the assembly 104 is removed. The silicone strip assembly 104 is dimensioned such that assembly ends 106, 108 extend free from the chafer strip 70 and the chafer strip channel 80, and extend a distance beyond the punched holes 102 at opposite ends of the chafer strip.

Figure 4:
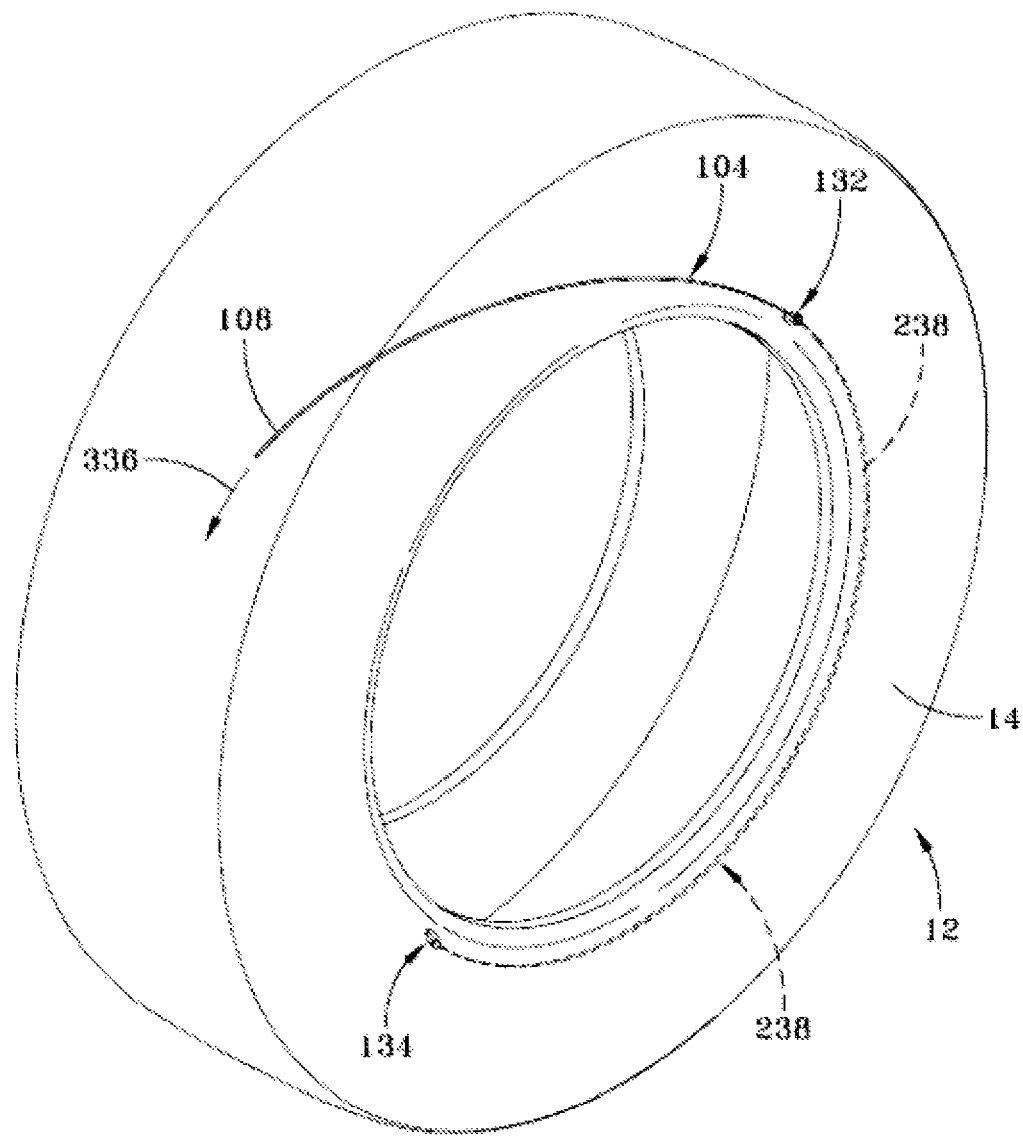
FIG. 4 is a side elevation showing a strip removed from a tire sidewall.

Chafer strip 70 is incorporated into sidewall 14 of tire 12 during tire building as is known in the art. Thereafter, as shown by FIG. 4, the strip assembly 104 is removed from the tire chafer channel by pulling on end 108 in direction 336, whereby the chafer channel left by the vacated core strip assembly 104 becomes an elongate unobstructed 180 degree air passageway 238 from the inlet cavity 132 to the outlet cavity 134, wholly integrated within the chafer component 70.

Rubber composition 92 remains incorporated into chafer 70 as the interior walls of the air passageway 238.

Figure 5:
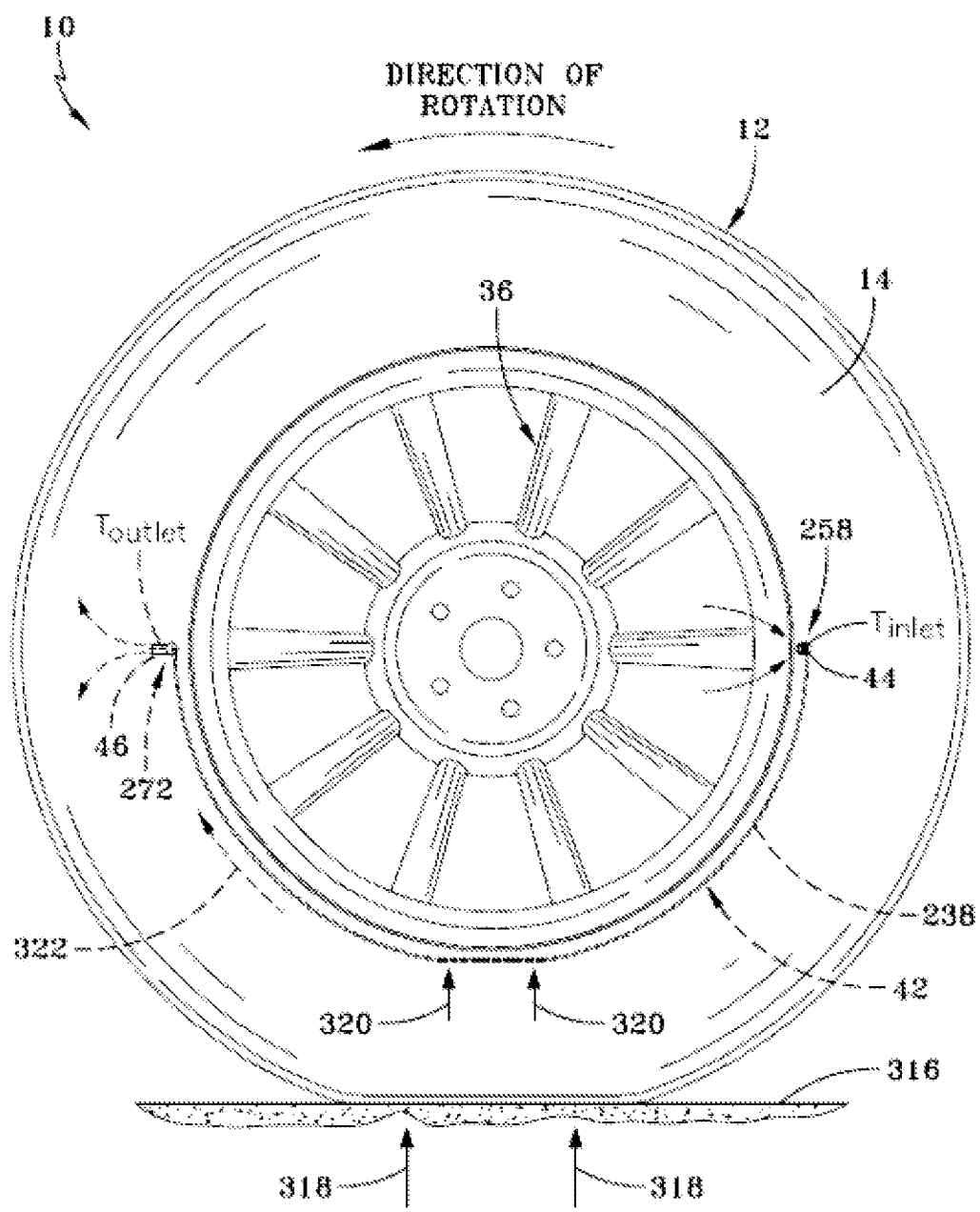
FIG. 5 is a side view of a finished tire showing air flow from inlet to outlet located in the tire cavity.

FIG. 5 shows the air maintenance assembly 42 in the tire 12 in operation (while mounted on wheel 36 as part of wheel assembly 10) and rolling against the ground surface 316. The air maintenance assembly 42 represents a peristaltic air pump system in which a compressible air passageway 238 progressively pumps air along the passageway from the inlet to the outlet and there to the tire cavity as required to maintain internal tire cavity pressure at a required level. As will be appreciated from FIG. 5, the inlet assembly 258 (located at the exterior sidewall surface) and the outlet assembly 272 (located at the tire interior cavity side) are positioned generally 180 degrees apart, separated by the internal chafer air passageway 238. The tire rotates in a direction of rotation indicated, causing a footprint to be formed against the ground surface 316. A compressive force 318 is directed into the tire from the footprint and acts to flatten a segment of the air passageway 238 opposite the footprint as shown at 320. Flattening of the segment of the passageway 238 forces air from the segment along internal passageway 238 in the direction 322, toward the outlet assembly 272.

As the tire continues to rotate in the direction indicated along the ground surface 316, the air passageway 238 within the chafer component will be sequentially flattened or squeezed opposite the tire footprint segment by segment in direction 322 opposite to the direction of tire rotation. The sequential flattening of the air passageway 238 segment by segment causes evacuated air 46 from the flattened segments to be pumped to the outlet assembly 272. Mechanisms as known in the art (not shown) are used to regulate the flow of air into the tire cavity at inlet assembly 258 and outlet assembly 272.

With the tire rotating as shown, flattened tube segments are sequentially refilled by air 44 flowing into the filtered inlet assembly 258 along the passageway 238. The inflow of air from the inlet assembly 258 continues until the outlet assembly 272 passes the tire footprint. When the tire rotates further, the inlet assembly 258 will eventually pass the tire footprint against ground surface 316, and airflow 46 resumes to the outlet assembly 272 along the passageway The relatively thin filament is an elongate body of relatively constant cross section. Suitable cross sections for the filament are not limited, and include circular, oval, lens, and the like. Suitable filaments include those made of metal and polymers. Suitable metals include steel. Suitable polymers include thermoplastics, silicone rubber, and the like.

Thermoplastics suitable for use as filaments include polyamides, polyesters, and poly(vinyl alcohols). Included in the polyamides are nylon 6, nylon 66, nylon 612, among others. Included in the polyesters are polyethylene terephthalate and polyethylene naphthalate, among others.

In one embodiment, the filament has a relatively circular cross section. In one embodiment, the filament has a diameter ranging from 0.5 to 5 mm.

In one embodiment, the filament is a so-called nylon monofilament. During operation, the internal surfaces of passageway 238 may experience cracking due to excess stress and strain due to the repetitive bending. Such cracking may lead to reduce pumping efficiency for the peristaltic tube. To reduce the likelihood of cracking in the internal passageway surfaces, the internal passageway surfaces include a rubber composition as further described. The rubber composition may be applied as compound 92 as shown in FIGS. 2A-2C, or alternatively chafer portion 70 as shown in FIGS. 1 and 3 may be constructed wholly or partially of the rubber composition, such that the surfaces of lips 82, 84 and surface 86 include the rubber composition.

The rubber composition includes a self-lubrication agent capable of migrating from the rubber composition to the groove surface and disposing on the groove surface as a liquid. By self-lubricating, it is meant that the self-lubrication agent will migrate by diffusion or otherwise from the bulk of the rubber composition to the groove surface, whereon the agent exists in liquid form to act as a lubricant to reduce the likelihood of cracking in the groove surface. Self-lubricating agents that may solidify at the surface are not usable, as the formation of the solid may cause blockage of the air passageway.

Suitable self-lubrication agents include liquids having a melting points of less than 0° C. In one embodiment, the self-lubrication agents has a melting points of less than −10° C. Melting point may be determined by methods as are known in the art, including ASTM D5440-93.

The self-lubrication agent may include an oil. Suitable oils include, paraffinic, and vegetable oils. Suitable vegetable oils include canola (rapeseed) oil, sunflower oil, soybean oil, castor oil, and the like.

In one embodiment, the rubber composition includes from 0.25 to 5 phr of the self-lubrication agent. In another embodiment, the rubber composition includes from 0.5 to 1.5 phr of the self-lubrication agent.

The rubber composition includes a vulcanization modifier.

In one embodiment, the vulcanization modifier for use in the second rubber composition include α,ω-bis(N,N'-dihydrocarbylthiocarbamamoyldithio)alkanes, bismaleimides, and biscitraconimides.

In one embodiment, the vulcanization modifier is a α,ω-bis(N,N'-dihydrocarbylthiocarbamamoyldithio)alkanes. Suitable α,ω-bis(N,N'-dihydrocarbylthiocarbamamoyldithio)alkanes include 1,2-bis(N,N'-dibenzylthiocarbamoyldithio)ethane; 1,3-bis(N,N'-dibenzylthiocarbamoyldithio)propane; 1,4-bis(N,N'-dibenzylth-iocarbamoyldithio)butane; 1,5-bis(N,N'-dibenzylthiocarbamoyl-dithio)pentane; 1,6-bis(N,N'-dibenzylthiocarbamoyldithio)hexane; 1,7-bis(N,N'-dibenzylth-iocarbamoyldithio)heptane; 1,8-bis(N,N'-dibenzylthiocarbamoyl-dithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren® from Bayer.

In one embodiment, the vulcanization modifier is a bismaleimide. Suitable bismaleimides include N, N'-m-phenylene bismaleimide, available as HVA-2 from DuPont.

In one embodiment, the vulcanization modifier is a citraconimide. Suitable citraconimidies include N, N'-m-xylylene biscitraconimide, also known as 1,3-bis(citraconimidomethyl)benzene, available as Perkalink® 900 from Flexsys.

In one embodiment, the rubber composition in one or more annular segments may comprise from about 1 to about 15 parts by weight, per 100 parts by weight of elastomer (phr), of the vulcanization modifier. In another embodiment, the rubber composition may comprise from about 2 to about 8 phr of vulcanization modifier.

The rubber composition includes one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content. The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Again with reference to FIGS. 1, 2A-2C, 3 and 4, internal surfaces of groove 80 and passageway 238 the rubber composition may be incorporated into the groove surfaces in a variety of ways. In one embodiment, the chafer 70 including the groove 80 and groove surfaces 82, 84, 86 is constructed wholly from the rubber composition, as by extrusion. In another embodiment, the rubber composition may be calendared or extruded onto the strip 58 as a layer of rubber composition 92 as shown in FIGS. 2A-2C, and then inserted into the groove 80. Upon vulcanization of the tire, the calendared rubber composition is incorporated into the groove and becomes the groove surface.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

What is claimed is:

1. A pneumatic tire comprising a sidewall component, the sidewall component including an air passageway extending at least partially about the circumference of the tire, the air passageway surrounded by and in fluid communication with a surface comprising a rubber composition, the rubber composition comprising:

a diene based rubber;
from 0.25 to 5 parts by weight, per 100 parts by weight of rubber (phr), of castor oil; and
from 1 to 15 parts by weight, per 100 parts by weight of rubber (phr), of a vulcanization modifier selected from the group consisting of α,ω-bis(N,N'-dihydrocarbylthiocarbamamoyldithio)alkanes, bismaleimides, and bis-citraconimides.

2. The pneumatic tire of claim 1, wherein the rubber composition comprises from 0.5 to 1.5 phr of the castor oil.

* * * * *